(No Model.) 10 Sheets—Sheet 3.
A. LANGUET.
DREDGING BOAT.

No. 412,341. Patented Oct. 8, 1889.

Witnesses:
John A. Rennie
J. A. E. Criswell

Inventor:
Alphonse Languet
By his Attorneys,
Arthur G. Fraser & Co.

(No Model.) 10 Sheets—Sheet 4.

A. LANGUET.
DREDGING BOAT.

No. 412,341. Patented Oct. 8, 1889.

WITNESSES:
John A. Rennie
J.A.E. Criswell

INVENTOR:
Alphonse Languet,
By his Attorneys,
Arthur E. Draper & Co.

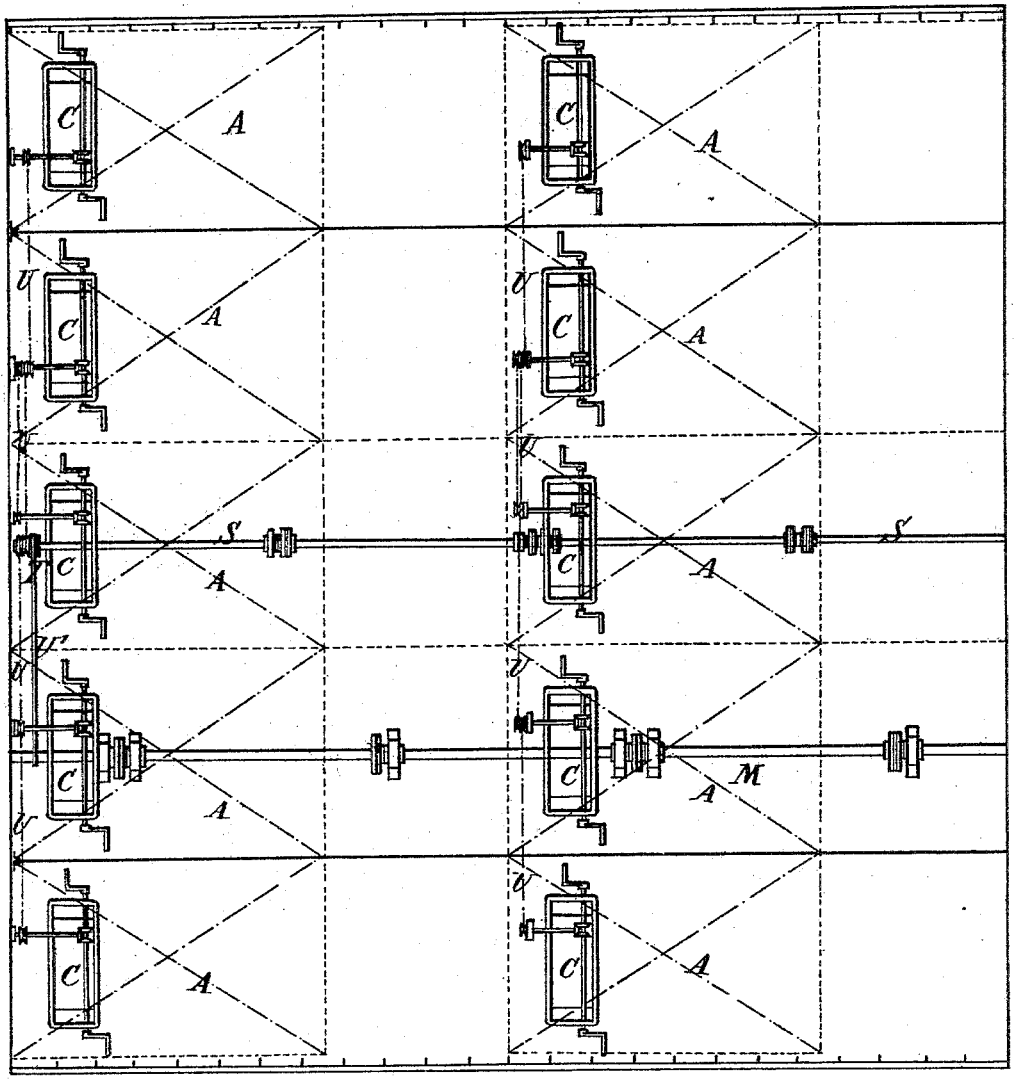

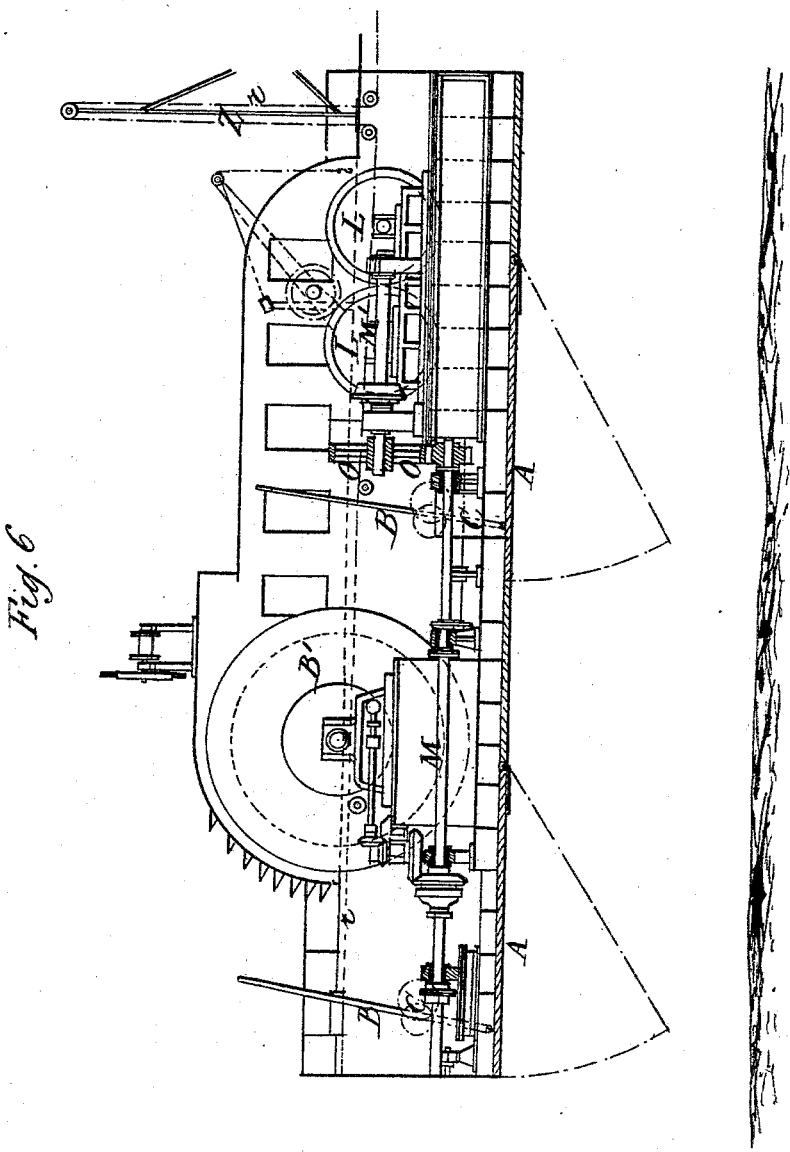

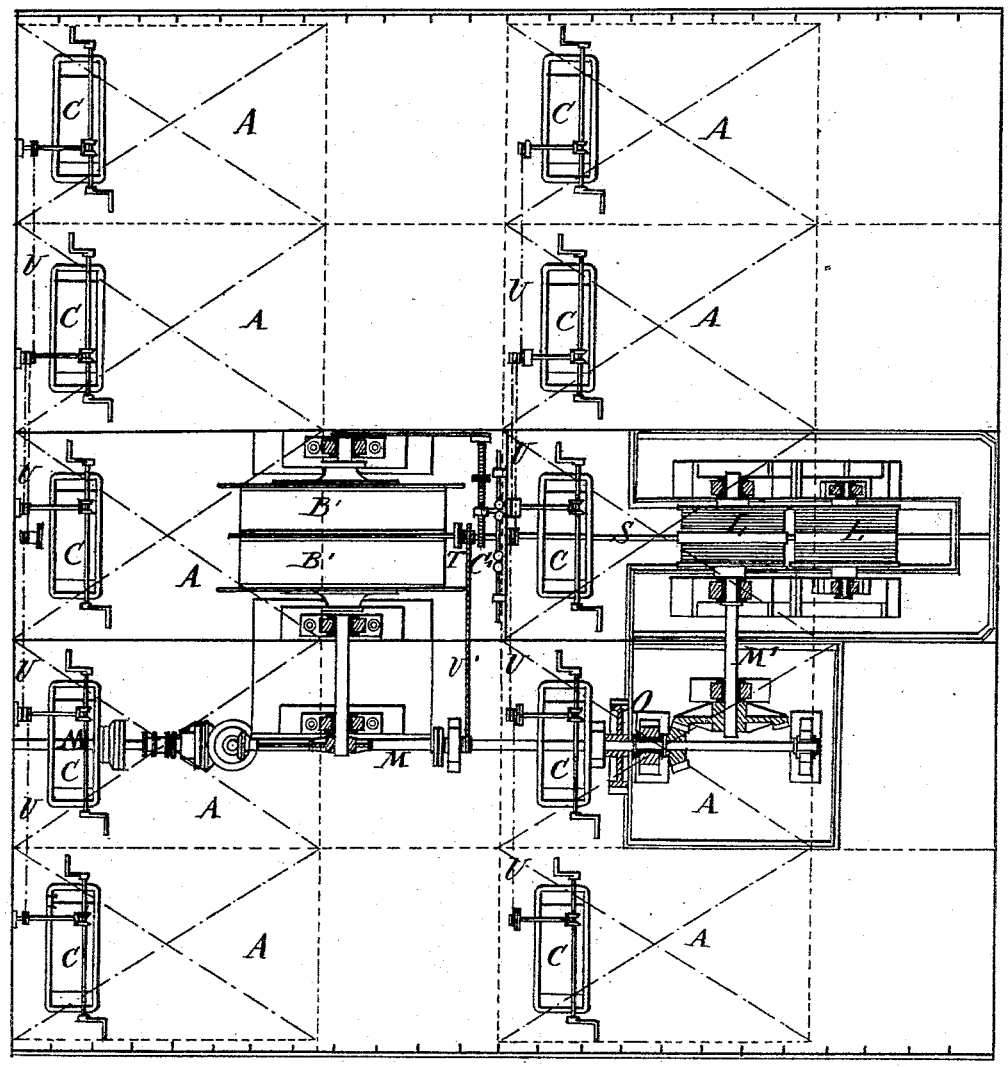

(No Model.) 10 Sheets—Sheet 8.
A. LANGUET.
DREDGING BOAT.
No. 412,341. Patented Oct. 8, 1889.
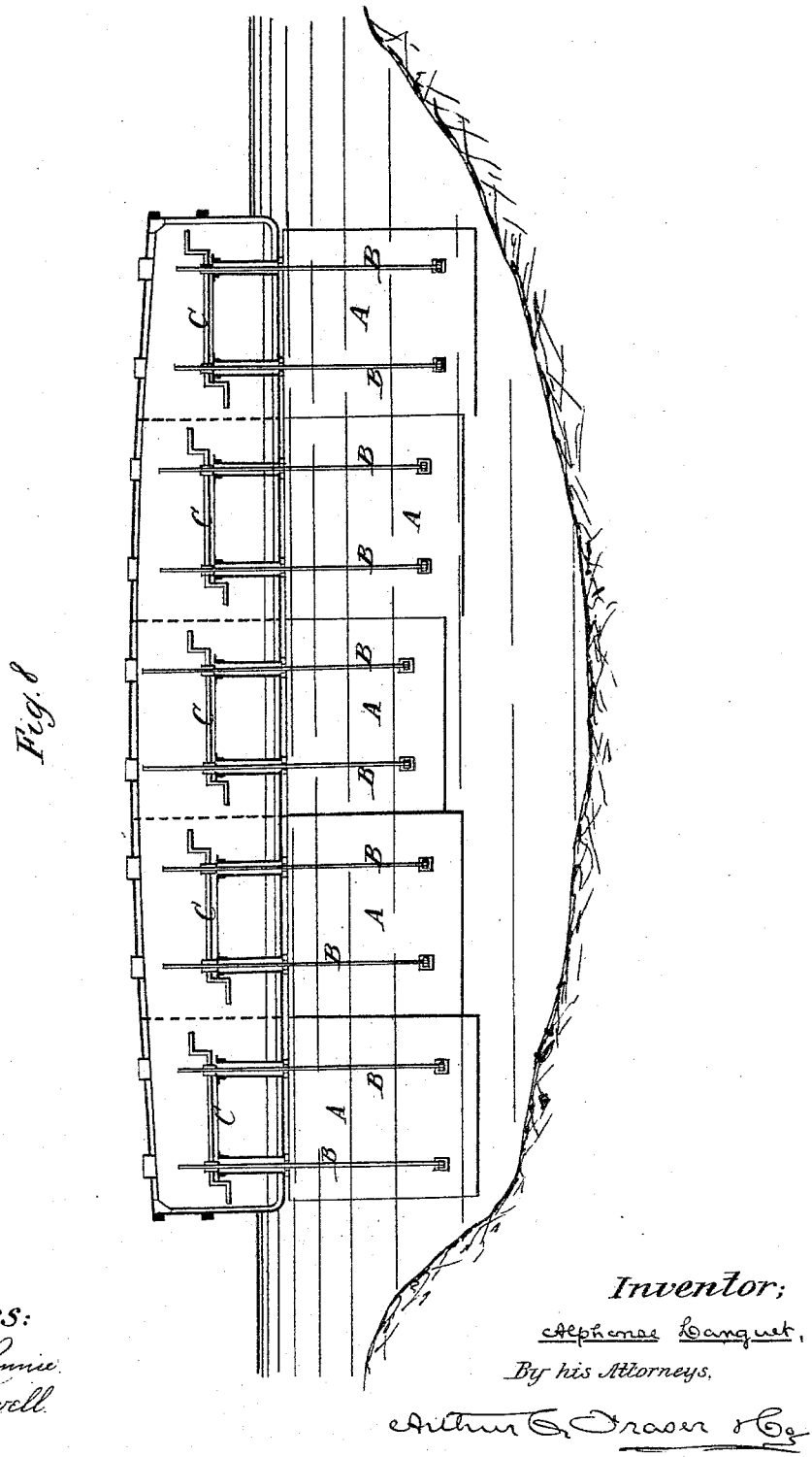

(No Model.) 10 Sheets—Sheet 9.
A. LANGUET.
DREDGING BOAT.
No. 412,341. Patented Oct. 8, 1889.
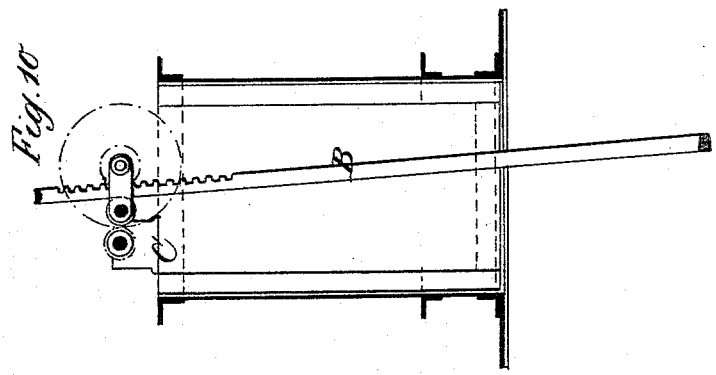
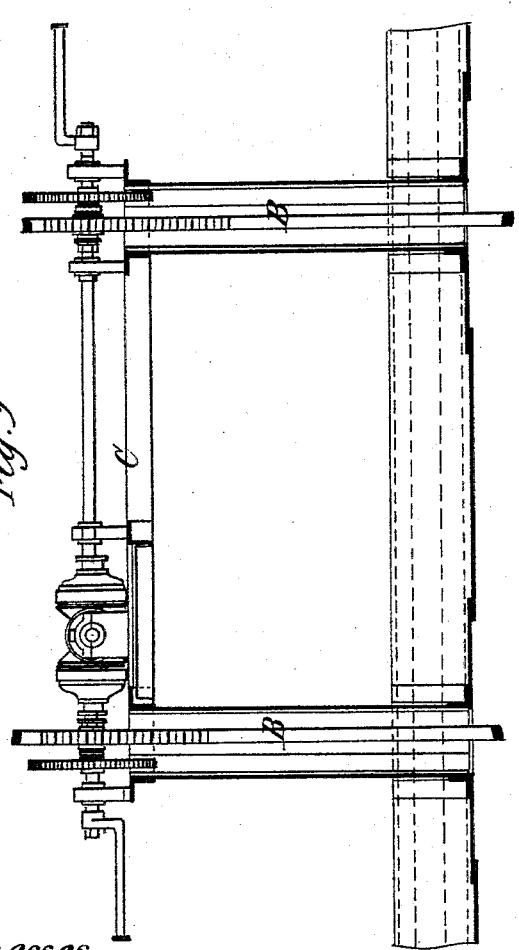
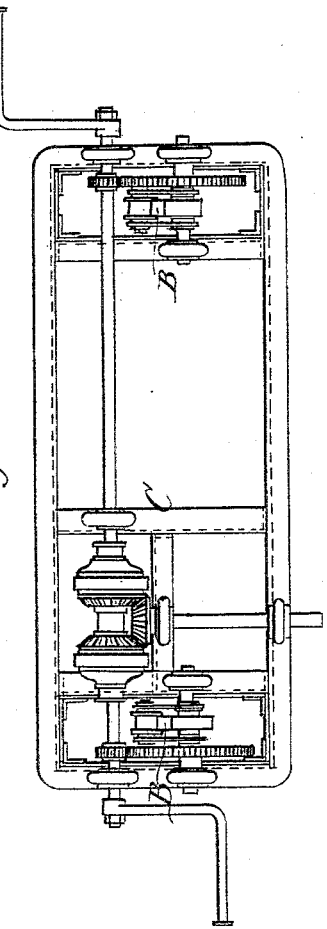
Witnesses:
John A. Rennie
J. A. E. Cuswell
Inventor;
Alphonse Languet
By his Attorneys,
Arthur E. Fraser & Co.

(No Model.) 10 Sheets—Sheet 10.
A. LANGUET.
DREDGING BOAT.
No. 412,341. Patented Oct. 8, 1889.
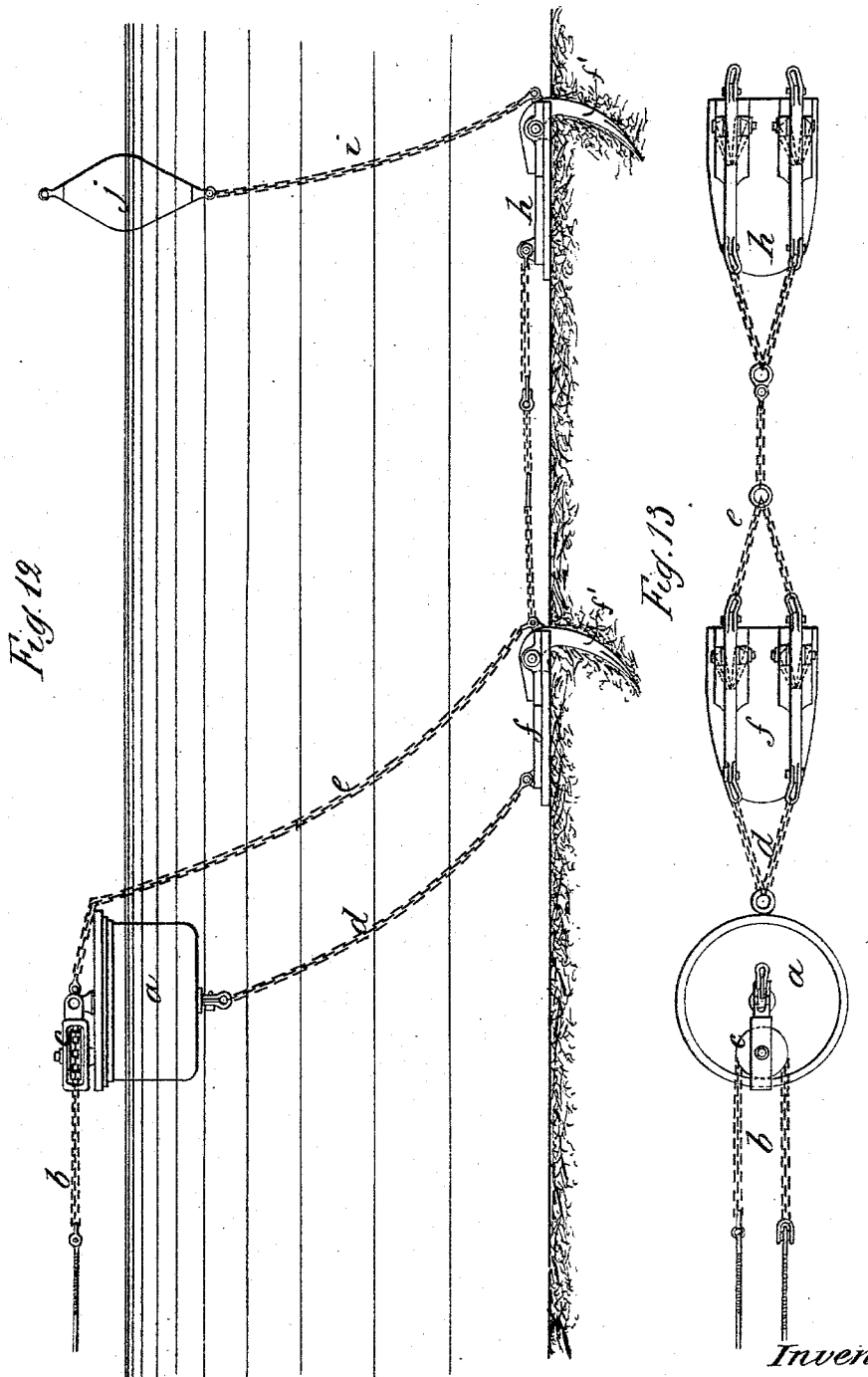
Witnesses:
John A. Renne
J. C. Criswell
Inventor:
Alphonse Languet,
By his Attorneys,
Arthur G. Fraser & Co.

UNITED STATES PATENT OFFICE.

ALPHONSE LANGUET, OF PARIS, FRANCE.

DREDGING-BOAT.

SPECIFICATION forming part of Letters Patent No. 412,341, dated October 8, 1889.

Application filed September 4, 1888. Serial No. 284,527. (No model.) Patented in France September 6, 1887, No. 185,670, and in England July 2, 1888, No. 9,603.

*To all whom it may concern:*

Be it known that I, ALPHONSE LANGUET, of Paris, France, have invented certain new and useful Improvements in Dredging-Boats, of which the following is a specification.

This invention has been patented in France by Letters Patent No. 185,670, dated September 6, 1887, and in Great Britain by Letters Patent No. 9,603, dated July 2, 1888.

The present application for a patent has for its object a boat suitably constructed for digging out the channels of water-courses and for dredging the bars at the mouths of streams and deepening their estuaries.

This improved dredging-boat is illustrated in the accompanying drawings, in which—

Figure 1:
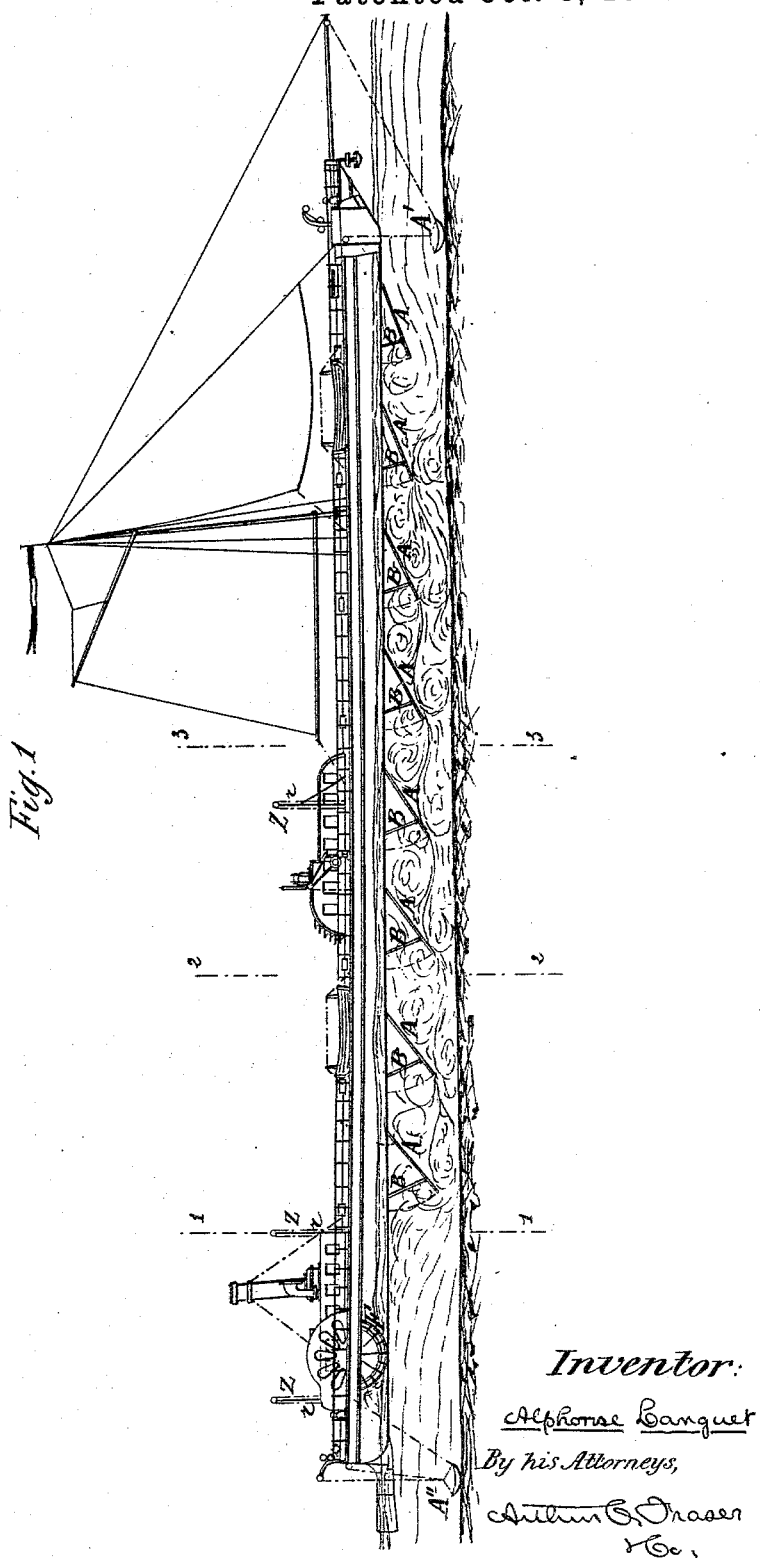
Figure 2:
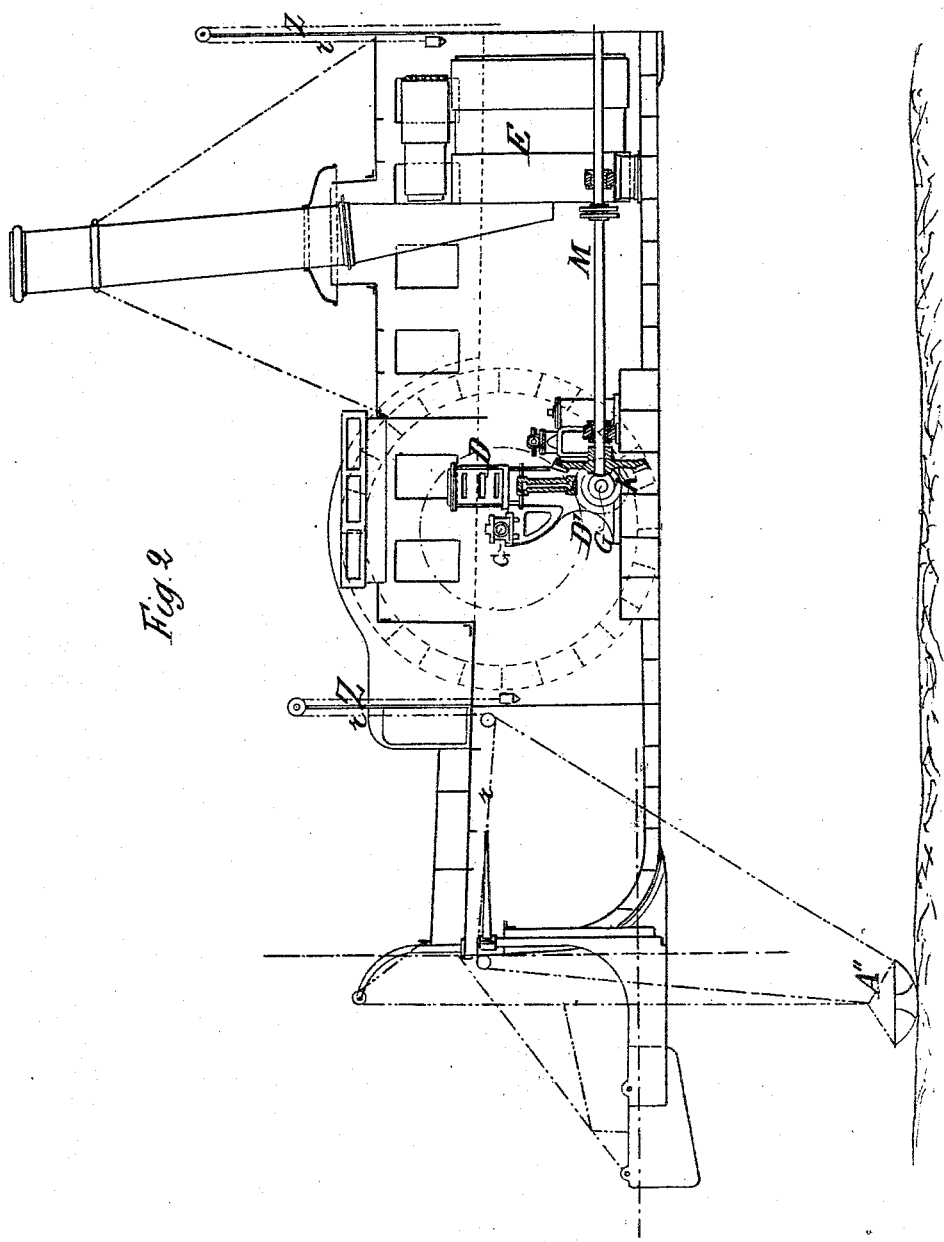
Figure 3:
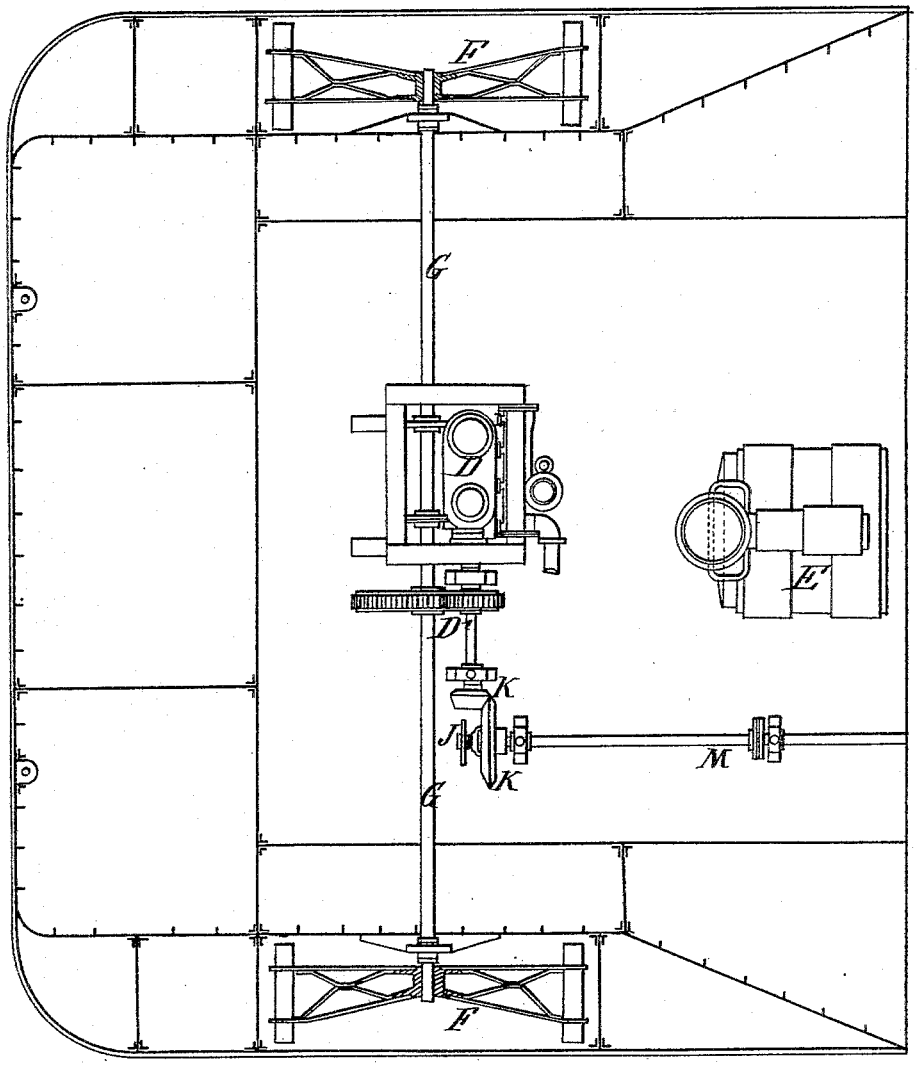
Figure 4:
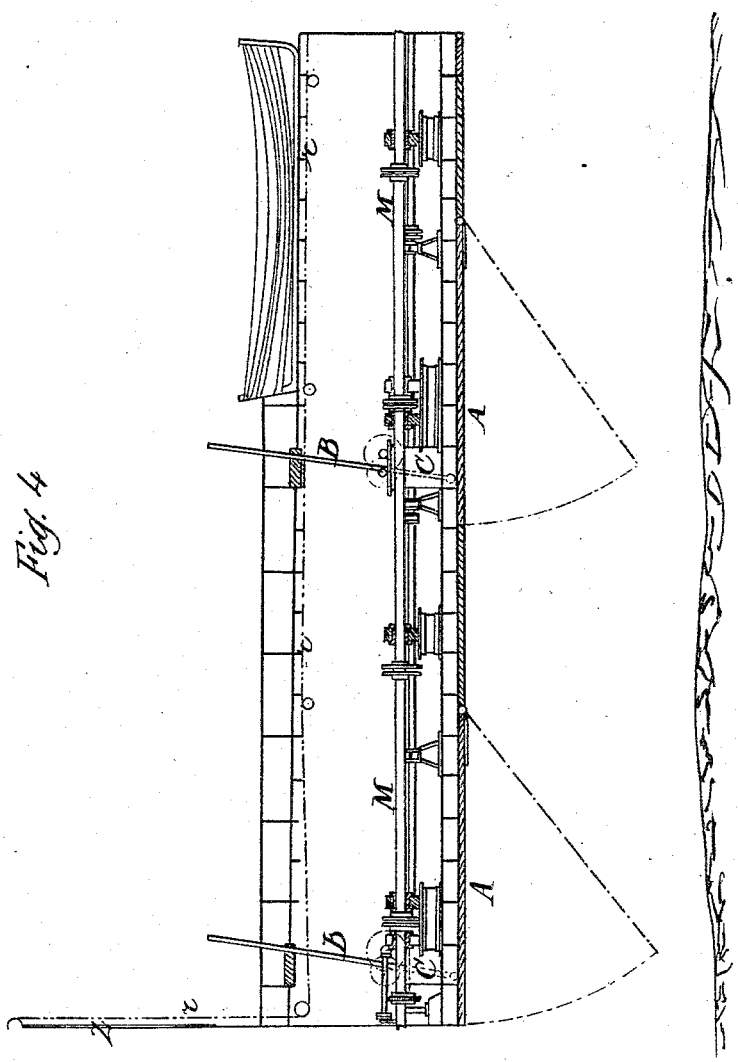

Figure 1 is a side elevation of the improved boat. Fig. 2 is a central vertical section of the rear end of the boat, that portion of the boat which is behind the line 1 1 in Fig. 1. Fig. 3 is a plan view, partly in horizontal section, of the same portion of the boat. Fig. 4 is a central vertical section of that portion of the boat which is between the lines 1 1 and 2 2 in Fig. 1. Fig. 5 is a plan view of this portion of the boat. Fig. 6 is a central vertical section of that portion of the boat which is between lines 2 2 and 3 3 in Fig. 1. Fig. 7 is a plan view of this portion of the boat. Fig. 8 is a cross-section of the boat, on a larger scale, which shows a row of the capstans employed for raising and lowering the wings arranged beneath the boat. Figs. 9, 10, and 11 are respectively front, end, and plane views of one of the capstans. Figs. 12 and 13 show in elevation and plan the construction of the anchoring mechanism.

A A are the wings or hinged leaves constituting gates, movable backward at an inclination which can be varied according to the work to be done by the boat. These wings or leaves can be varied as to their number; but there are shown in the drawings forty of them arranged in eight rows of five each. These wings are moved by means of rods B B, having rack-teeth at their upper ends, two of said rods being connected to each wing. These rods are hinged or otherwise pivotally connected to the wings, and are guided at their upper ends and adjusted to their different positions by special mechanism, hereinafter to be described. The wings A A can be raised and lowered at will by means of capstans C C. These capstans can be moved altogether or singly either by steam or by hand.

D is a compound or triple-expansion steam-engine.

E is the steam-generator for feeding the engine D.

F F are the paddle-wheels for driving the boat, and G is the shaft of these wheels. Motion is transmitted from the drive-shaft of the engine to these paddle-wheels F F by cog-gearing D'.

The several capstans are operated from the engine by means of beveled gears K K.

L L are towing-drums operated from the engine by means of the horizontal shaft M, driven by the bevel-gears K K, and the shaft M', driven from the shaft M through the gears O O.

S S are longitudinal shafts for operating the capstans which raise and lower the movable wings beneath the boat.

T T are pulleys on the shafts S S for operating the capstans C C.

U U are chains connecting the pulleys T T with shafts which are connected by suitable gearing with the shafts of the capstans.

Z Z are indicating-posts for the sounding devices.

A' A'' are sounders for indicating the depth of the water.

B' B' are drums, upon which are wound the towing-cables. These drums are rotated from the engine by means of friction-gear, bevel-gears, and an endless screw. The bevel-gear fixed on the shaft M has resting upon it another friction bevel-gear acted upon by a spring having a tension so arranged as to exercise upon the cables a force of ten kilograms. This arrangement is rendered necessary on account of the increasing leverage upon the drums due to the winding of the cables thereupon.

C' is a mechanism for regulating the winding of the towing-cables upon the drum. This mechanism is composed of a screw having two threads cut in opposite directions, upon which is placed a forked sliding rod which communicates to the cables a lateral displacement equal to their diameter at each rotation of the drum.

The anchoring mechanism shown in Figs. 12 and 13 comprises a buoy *a* for anchoring the dredging-boat. A chain *b* is connected with the towing-cables. This chain is arranged in every case so as to equalize the traction upon each cable by being passed around a pulley *c*, connected to the buoy. The anchor *f* has two flukes *f'* pivotally connected therewith. The anchor *f* is connected with the buoy by means of a chain *d*, and the pivoted flukes *f''* are also connected with the buoy by a chain *e*, by means of which the flukes may be drawn out of the bottom of the stream when it is desired to lift the anchor. In case one anchor is insufficient to hold the boat a second anchor *h* may be employed. This anchor is connected with the first anchor by a chain, and its flukes are connected by a chain *i'* to a second buoy J.

I will now describe how I operate in the estuary of a river—such as that of the Seine, for example—for cutting from its channel a sand-bar and for transporting the material to the deep water farther down the stream. I carry on the operations at high tide and during the ebb. At first I anchor the boat above the sand-bar. I then permit the boat to descend until it is just below the sand-bar without doing any work, the movable wings beneath the boat being raised. When the boat thus occupies a position below the sand-bar, with its anchors secured above the sand-bar, I lower the wings beneath the boat and put the engines in motion in such manner that the boat will be moved by the towing mechanism against the tide. By reducing the space through which the water may pass between the lower edges of the wings beneath the boat and the surface of the sand-bar or other obstruction which is to be removed the force of the water will be increased, and accordingly by this means I increase its force sufficiently to stir up the sand and other earthy materials, which the water will sweep along according to the force and swiftness which it has acquired, and with it it will carry the sand and other material in suspension. After having traveled up-stream for a distance of, say, one hundred meters, I raise the wings and permit the boat to redescend for making a second upward movement. I thus operate through a series of passages until that portion of the channel upon which I am working has been dredged out to the desired depth. As it often happens, if the sand-bar is too long I limit each passage of the boat to a part of its length, and I make as many successive operations as may be necessary, taking care in every case, however, that the material may be removed first from the lower or outer portion of the sand-bar, so that the material which has been taken from the bar and held in suspension by the water shall be carried down the stream into water so deep that when there deposited it will not constitute an obstruction. In operating the boat for dredging purposes the several rows of wings or leaves may be lowered at different angles, so that each successive row across the boat will serve to scour out a portion of the sand-bar. The two sounders A' A'' are each composed of a small metallic boat of a weight a little greater than that of the water. The sounders are arranged at each end of the boat. One is attached to the front end of the boat and is dragged along over the sand-bar, and has for its object the indication of the depth of water which exists in the path of the boat. Metal chains *r* are attached to the sounders and pass over pulleys and are thence lead over pulleys at the top of the indicating-posts Z, which have reading-scales marked thereon, so that by means of a weight attached to the end of each of the chains *r* the depth of the water on the sand-bank may be indicated. An attendant will be placed in the vicinity of this indicating-post, so as to read the depth of the water which is there to be passed over by the boat, and he can then judge how the wings or leaves should be operated for bringing about the best results. The second sounder is arranged at the other end of the boat, and it has for its object the indication of the amount of work done in deepening the channel—that is to say, if the sounder in front indicates one meter and the sounder in the rear indicates one meter and thirty centimeters, it would show that thirty centimeters of the sand had been displaced in the passage of the apparatus over the sand-bank. This amount will depend upon the length of the passages and on the size of the apparatus, and in this manner there may be calculated the cubical contents of the material removed from the channel at each passage of the boat.

The boat which is illustrated in the accompanying drawings is designed for accomplishing considerable work, and is applicable to the estuaries of rivers—such as that of the Seine—where the scouring action of the alternating currents of the ebb and flood tides displace considerable quantities of sand and earthy materials. The following figures give an approximate estimate of the work done by my dredging-boat: Width of the boat, twenty meters; depth of water beneath the wings, 0.40 meters. The swiftness of the tide varies between 1.50 meters and four meters per second; the speed of the boat, 1.50 meters per second; average combined speed, four meters per second; amount of water each second, thirty-two cubic meters; earthy matters held in suspension, about one-third of ten cubic meters; material removed in one hour, thirty-six thousand cubic meters; amount removed in six hours—that is, during the ebb tide—two hundred and sixteen thousand cubic meters.

In rivers having a continuous current, where the period of daily work can be prolonged, the dimensions and cost of the boat can be reduced and still displace a large quantity of material.

I claim as my invention—

1. A boat for dredging the channels of rivers and the like, having a closed bottom, in combination with a plurality of rows of downwardly-extending independently-adjustable wings or vanes on said bottom, each row containing a plurality of wings or vanes, the lower edges of said wings or vanes being adjustable to positions just above an obstruction or bar, whereby the force of the current or tide passing between the wings or vanes and the obstruction or bar removes the latter, substantially as set forth.

2. A boat for dredging the channels of rivers and the like, having a closed bottom and a plurality of rows of downwardly-extending independently-adjustable wings or vanes on said bottom, each row containing a plurality of wings or vanes, the lower edges of said wings or vanes being adjustable to positions just above an obstruction or bar, in combination with anchoring devices, rotary drums on said boat, and cables connecting said drum with said anchoring devices for moving said boat against the current or tide, substantially as set forth, whereby the force of the current or tide passing between the vanes or wings and the obstruction or bar is increased.

In witness whereof I have hereunto signed my name in the presence of two subscribing witnesses.

ALPHONSE LANGUET.

Witnesses:
 ROBT. M. HOOPER,
 AMAND RITTER.